United States Patent
Clermidy et al.

(10) Patent No.: US 6,826,709 B1
(45) Date of Patent: Nov. 30, 2004

(54) RECONFIGURATION METHOD APPLICABLE TO AN ARRAY OF IDENTICAL FUNCTIONAL ELEMENTS

(75) Inventors: Fabien Clermidy, Fontenay le Fleury (FR); Thierry Collette, Les Ulis (FR)

(73) Assignee: Commissariat a l'Energie Atomique, Paris (FR)

( * ) Notice: Subject to any disclaimer, the term of this patent is extended or adjusted under 35 U.S.C. 154(b) by 594 days.

(21) Appl. No.: 09/763,204
(22) PCT Filed: Jun. 30, 2000
(86) PCT No.: PCT/FR00/01861
§ 371 (c)(1), (2), (4) Date: Feb. 20, 2001
(87) PCT Pub. No.: WO01/02960
PCT Pub. Date: Jan. 11, 2001

(30) Foreign Application Priority Data

Jul. 2, 1999 (FR) .......................... 99 08554

(51) Int. Cl.$^7$ .............................. G06F 11/00
(52) U.S. Cl. .............. 714/4; 714/10; 714/11; 714/12; 700/82
(58) Field of Search .............. 714/10, 11, 12, 714/4, 13; 700/82; 712/15

(56) References Cited

U.S. PATENT DOCUMENTS 5,065,308 A * 11/1991 Evans .......................... 714/11
6,646,989 B1 * 11/2003 Khotimsky et al. ......... 370/238
6,681,316 B1 * 1/2004 Clermidy et al. ............ 712/11

OTHER PUBLICATIONS

Chean et al. A Taxonomy of Reconfiguration Techniques for Fault–Tolerant Processor Arrays. IEEE Computer, pp. 55–69.*

Roychowdhury et al. Efficient for Reconfiguration in VLSI/WSI Arrays. IEEE Transactions, vol. 39, No. 4, pp. 480 489.*

Belkhale et al. Reconfiguration Strategies for VLSI Processor Arrays and Trees Using a Modified Diogenes Approach. IEEE Transactions, vol. 41, No. 1. pp. 83–96.*

Kung et al., Fault–Tolerant Array Processors Using Single–Track Switches. IEEE Transactions, vol. 38, NO. 4. pp. 501–514.*

Chen et al. A Comprehensive Reconfiguration Scheme for Fault–Tolerant VLSI/WSI Array Processors. IEEE Transactions, vol. 46, No. 12. pp. 1363–1371.*

Varvarigou et al. Reconfiguring Processor Arrays Using Multiple–Track Models: The 3–Track–1–Spare–Appraoch. IEEE Transactions, vol. 42, No. 11. pp. 1281–1293.*

Ku et al. Structural Fault Tolerance in VLSI–Based Systems. IEEE. pp. 50–55.*

(List continued on next page.)

Primary Examiner—Robert Beausoliel
Assistant Examiner—Yolanda Wilson
(74) Attorney, Agent, or Firm—Thelen Reid & Priest LLP

(57) ABSTRACT

This invention relates to a method for reconfiguring a network of parallel functional elements tolerant to the faults of these functional elements including said basic functional elements (P), spare functional elements (Sp), interconnecting elements (Cm) of these functional elements and a control unit, said method comprising:

a step of positioning the functional elements of the logic network on the physical network;

a routing step of programming interconnecting elements on the physical network, by choosing a maximum number of interconnecting elements which can be passed between two neighbouring processors using a shortest track search algorithm.

6 Claims, 14 Drawing Sheets

| $P_{0,0}$ | $P_{0,1}$ | $P_{0,2}$ | $P_{0,3}$ |
|---|---|---|---|
| $P_{1,0}$ | $P_{1,1}$ | $P_{1,2}$ | $P_{1,3}$ |
| $P_{2,0}$ | $P_{2,1}$ | $P_{2,2}$ | $P_{2,3}$ |
| $P_{3,0}$ | $P_{3,1}$ | $P_{3,2}$ | $P_{3,3}$ |
| $Sp_0$ | $Sp_1$ | $Sp_2$ | $Sp_3$ |

OTHER PUBLICATIONS

Varvarigou, T.A., et al., "New Algorithms for Reconfiguring VLSI/WSI Arrays," vol. 3, No. 4., 15 pages.

Kim, J.H., et al., "An On–Line Reconfiguration Algorithm of WSI Processor Arrays," vol. CONF. 25, 3 pages.

Popli, S.P., et al., "A Reconfigurable VSLI Array for Reliability and Yield Enhancement," vol. CONF. 2, 11 pages.

Clermidy, F., et al., "A New Placement Algorithm Dedicated to Parallel Computers: Bases and Application," 7 pages.

Nihar R. Mahapatra, et al. "Hardware–Efficient and Highly–Reconfigurable 4–and 2–Track Fault–Tolerant Designs for Mesh–Connected Multicomputers" *1996 IEEE Proceedings of FTCS–26*, P. 272–281.

Les ASIC"Des circuits de traitement d'images pour la vision industrielle" le.traitement du singnal et de l'image, P. 3–5.

* cited by examiner

| $P_{0,0}$ | $P_{0,1}$ | $P_{0,2}$ | $P_{0,3}$ |
|---|---|---|---|
| $P_{1,0}$ | $P_{1,1}$ | $P_{1,2}$ | $P_{1,3}$ |
| $P_{2,0}$ | $P_{2,1}$ | $P_{2,2}$ | $P_{2,3}$ |
| $P_{3,0}$ | $P_{3,1}$ | $P_{3,2}$ | $P_{3,3}$ |
| $Sp_0$ | $Sp_1$ | $Sp_2$ | $Sp_3$ |

| 1 | 2 | 4 | 7 |
|---|---|---|---|
| 3 | 5 | 8 | 11 |
| 6 | 9 | 12 | 14 |
| 10 | 13 | 15 | 16 |
| $Sp_0$ | $Sp_1$ | $Sp_2$ | $Sp_3$ |

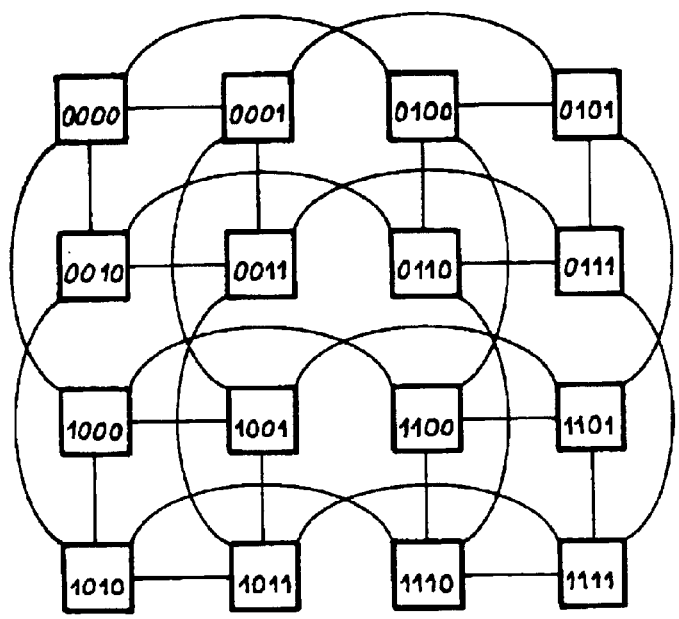
FIG. 16
FIG. 17
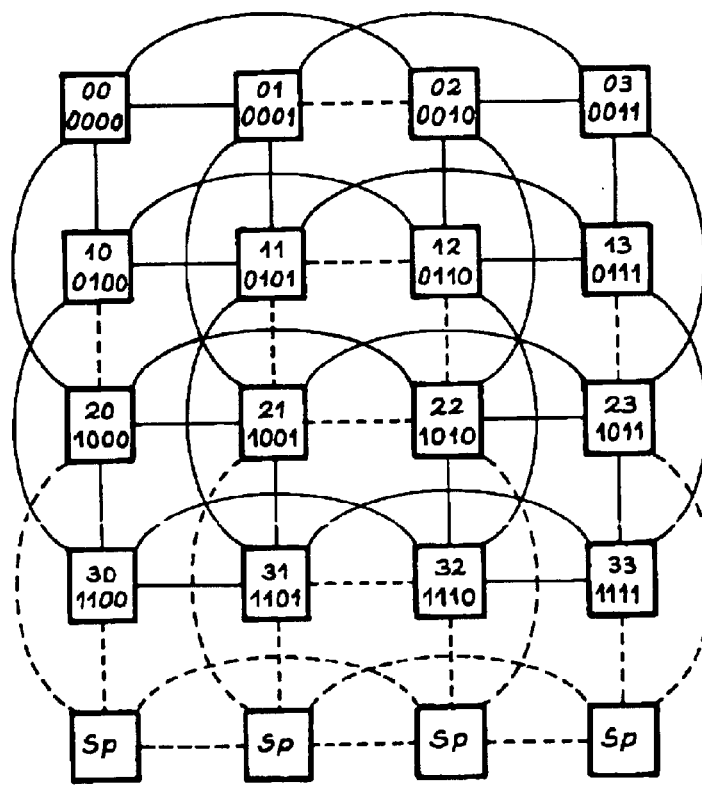

RECONFIGURATION METHOD APPLICABLE TO AN ARRAY OF IDENTICAL FUNCTIONAL ELEMENTS

TECHNICAL FIELD

This invention relates to a reconfiguration method applicable to a network of identical functional elements.

The field of the invention is in particular that of parallel computers composing a unit of matrix, ring, or hypercube interconnected processors, and that of 1D or 2D correlators, matrix architectures of blocks computing the fast Fourier transform (FFT). Two examples of the first kind of applications are thus given in the document referenced as [1] at the end of the description.

PRIOR ART

The increasing possibilities of micro-electronic technology, as well as the evolution of multiprocessor architectures, are leading to computers that are more and more complex both in terms of elements composing them (electronic gates, memories, registers, processors, . . . ) and in terms of complexity of the software used.

The designers of such computers having a high integration parallel or extensively parallel structure must take into account two conflicting requirements:

1 Machines having a parallel or extensively parallel structure are subject to faults due to the very great number of processors and their complexity, leading to poor manufacturing output and serious faults under normal operation.

2 With highly advanced technologies and high integration systems, more and more processors can be incorporated into an application specific integrated circuit (ASIC), a multichip module (MCM) or a card. In such systems, the main disadvantage is that of limited bandwidth, i.e. the amount of information that can be put through.

In order to meet the first of these requirements, one solution of known art consists in replacing faulty processors with spare processors which are identical to the others from an operational point of view. Such a solution, enabling "structural fault tolerance", then tries to ensure proper operation, and in particular network consistency, so as not to penalize the architecture. It implies reconfiguration consisting in replacing faulty elements with spare elements available due to interconnection elements and intercommunication elements.

In a 2D (or bidimensional) type of network, the solutions proposed for providing fault tolerance are:

Adding as many processor lines to the system as faults are to be tolerated. This solution is very simple and requires few spare interconnections, reconfiguration being performed by simply bypassing the lines where there is a faulty processor. Performance loss is then limited. On the contrary, the spare processors are very poorly used as one line is required to tolerate one fault, and in case of a faulty bypass, the whole system is down.

Or adding switches, spare processors and connections to the standard network.

As described in the document referenced as [2], a network corresponding to the latter type of solution and called "m-Track, n-Spare" is composed of processors 10, switches and spare connections. Two kinds of switches are used: switches 11 coupling processors with connections (PT= Processor to Track) and switches 12 coupling connections with each other (TT=Track-to-Track). All network links are bi-directional, i.e. communications can come and go in each connection. Spare processors 13 (sp) are positioned at the network borders. For the reconfiguration method to be effective, these processors must be positioned at least in one line and one column of the network.

FIG. 1 illustrates a sample network of the "2-Track, 1-Spare" type. Spare processors 13 (sp) are positioned all around the network and are used to reconfigure the network in case the useful processors 10 are faulty. Switches 11, 12 are used to enable reconfiguration. Here, the network has 200% of spare connections in comparison with the so-called operational connections.

Those skilled in the art can then use a reconfiguration method, based on error correcting codes, which can be broken down into two phases:

the first one consists in finding, for each faulty processor, a compensation track bypassing the faulty processor and replacing it with a spare processor;

in case the first phase is successful, each processor, along the compensation track, is replaced with its nearest neighbour, thus reaching, through cascading changes, a spare processor. The operational grid is thus maintained.

The reconfiguration method considered above has two major disadvantages:

it is not suitable for unidirectional links; indeed, in this case, two connection buses, one round trip, are required for connecting the considered processor to each of its neighbours.

the number of switching elements passed between two logically neighbouring processors is not deterministic, which makes the method ineffective for dealing with the case of synchronous interprocessor communications.

In order to overcome these disadvantages, it is an object of the inventive method to solve the problem of fault tolerance in an extensively parallel architecture with significant coupling of functional elements, by proposing a solution meeting the following constraints:

obtaining a fault tolerant network with connections that may be unidirectional;

highly limiting inoperative communication media of the network;

limiting communication time between functional elements by limiting the number of reconfiguration switches passed between two functional elements;

allowing greater flexibility for choosing the number of spare functional elements;

having a solution capable of supporting different topologies, in particular matrix, ring or hypercube topologies.

SUMMARY OF THE INVENTION

This invention relates to a reconfiguration method of a network of parallel identical functional elements tolerant to the faults of these functional elements, the network comprising said basic functional elements, spare functional elements, interconnecting elements of these functional elements, and a control unit, said method comprising:

a step of positioning the functional elements of the logic network;

a routing step of programming interconnecting elements on the physical network, by choosing a maximum number of these interconnecting elements which can be passed between two neighbouring functional elements using a shortest track search algorithm.

In the method of the invention:

a sequence is determined for positioning the functional elements of the network that is composed of a starting functional element and a series of functional elements including all functional elements;

for each of the functional elements, it is tentatively positioned starting with its logical position, then, if required in case of failure, in each of the positions located at a distance 1, distance 2, . . . from the logical position of this functional element, a restriction being that one and only one spare position must be used with respect to the possible positions of the previously positioned functional elements, stopping when S+1 positions have been tested, S being the number of spare functional elements;

if S+1 positions have been tested without success, returning to the previous functional element in the positioning sequence and proceeding with the next position for this functional element;

possibly, when all functional elements have been positioned, it is checked for each network dimension that the logical sequence is followed for each pair of functional elements, if not, the positions of these functional elements are inverted.

In one embodiment, the positioning sequence is defined like this: the starting functional element is the top left functional element, the next functional elements are the functional elements to the right and below the starting functional element, and so on, following a diagonal.

It is also possible to divide the network into blocks and define a block positioning sequence starting with a starting block and going through all the blocks from one neighbouring block to the next, with the positions for the functional elements of one block not including any logical position of the functional elements of the previously positioned blocks.

Advantageously, this inventive method can be implemented either statically, or dynamically during operation.

It appears to be important to specify the two following issues:

The inventive method allows possibilities of fault tolerance to be easily included at interconnections and interconnecting elements.

The inventive method is at the opposite of prior methods in as far as the features of the network, which are the number of spare links and the organization of the interconnecting elements are not imposed by the method, which allows greater flexibility in the choice of the fault tolerant architecture.

BRIEF DESCRIPTION OF THE DRAWINGS

FIGS. 16 to 19 illustrate several examples of processor networks of the hypercube type, i.e. a 3-dimensional hypercube in FIG. 16, a hypercube having a virtual regular structure with four spare processors in FIG. 17, an example of hypercube reconfiguration comprising three faulty processors derived from the method of the invention in FIG. 18, and a 4-dimensional hypercube comprising a line of spare processors in FIG. 19.

DETAILED DESCRIPTION OF EMBODIMENTS

This invention relates to a method for reconfiguring a network of identical functional elements.

Reconfiguration Method

Figure 1:
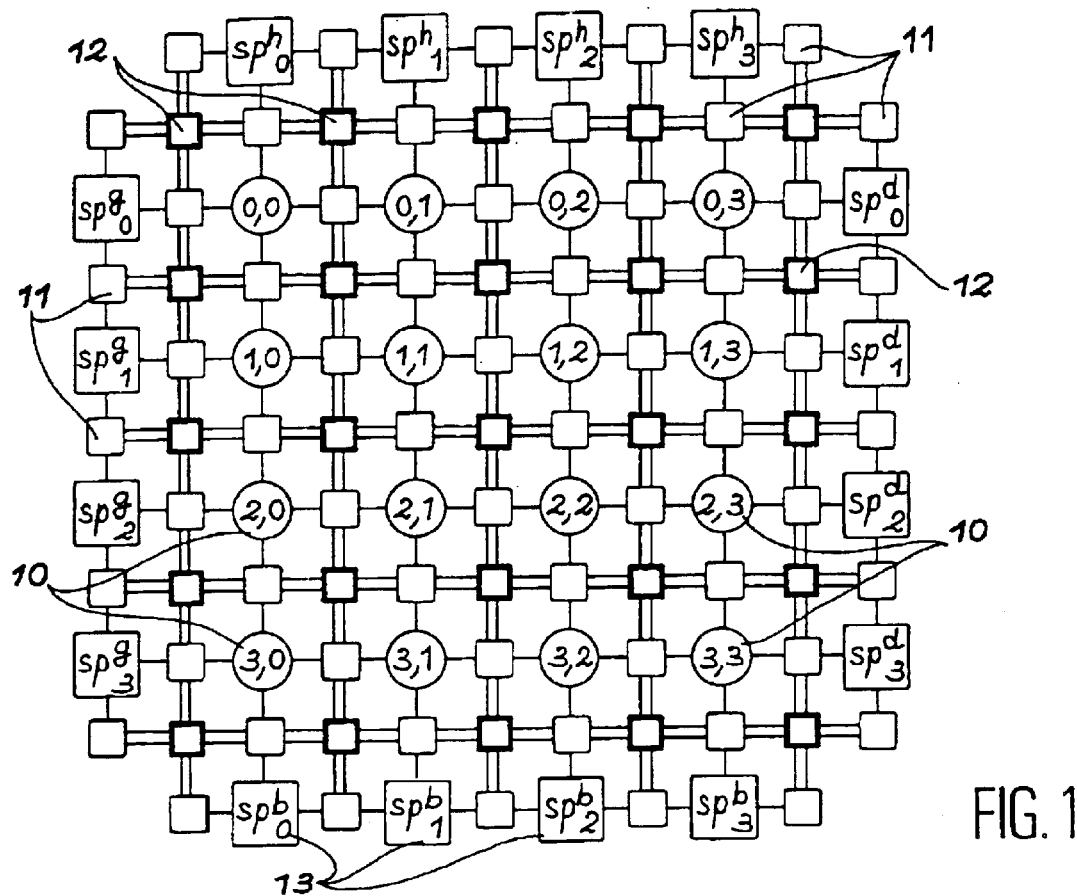
FIG. 1 illustrates a known art processor network.

In the "m-Track, n-Spare" structure of the known art, illustrated in FIG. 1, the reconfiguration method consists in searching for a track called "compensation track" to replace a faulty elementary functional element with a spare functional element. Then, starting with this faulty elementary functional element, each functional element is replaced with the next functional element available, the nearest one on the track. However, this method is really efficient only when there are spare functional elements in at least one line and one column, which is not possible with one line of spare functional elements and two unidirectional tracks. Also, such a method does not allow the number of switches in the communication tracks to be reduced.

On the other hand, the reconfiguration method of the invention is based on a positioning technique not correlated with routing.

Positioning consists in physically positioning logical neighbouring functional elements. The logical position of a functional element is the position this functional element occupies in the network without any faulty functional element; the physical position of a functional element is the position occupied by this functional element after application of the method when a fault has been detected. Positioning is bound to succeed provided the number of faulty functional elements is less than or equal to the number of spare functional elements.

Routing consists in programming interconnecting elements. The number of switches that can be passed between two neighbouring functional elements is chosen. This number is limited: three or four switches result in good reconfiguration throughput. The routing algorithm can thus test the greatest number of possible routings in a very short time with an appropriate algorithm.

In prior art systems, programming the switching elements is provided in as far as a replacement position has been found for each faulty functional element following a precise algorithm. The algorithms for positioning functional elements on the physical grid and for routing switching elements cannot be dissociated.

In the inventive method, only functional element positioning is innovative. Routing interconnecting elements is performed by a shortest track search algorithm, known by those skilled in the art, as this algorithm can be used in the invention due to the restrictions made on track length, and in particular, the number of interconnecting elements passed.

Positioning Step

Figure 2A:
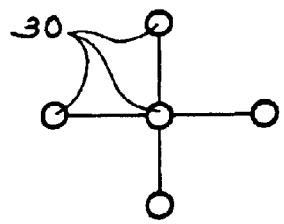
FIGS. 2A and 2B illustrate a sample network obtained by the inventive method.
Figure 2B:
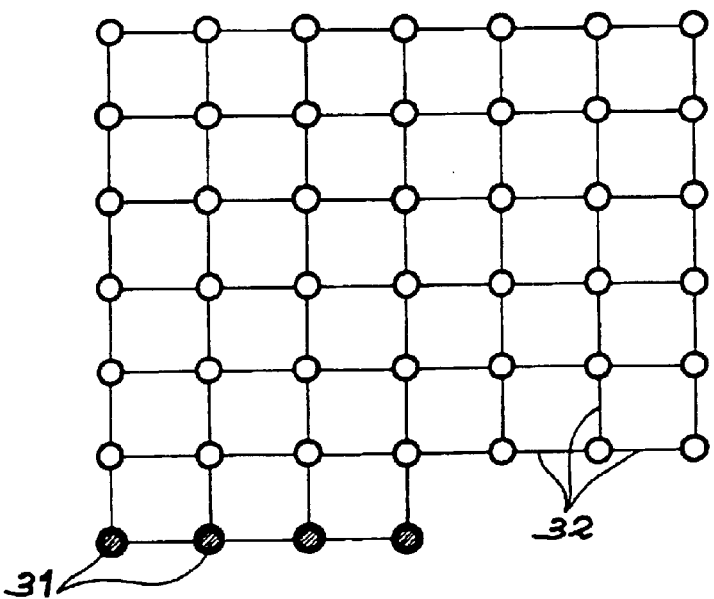
Figure 3:
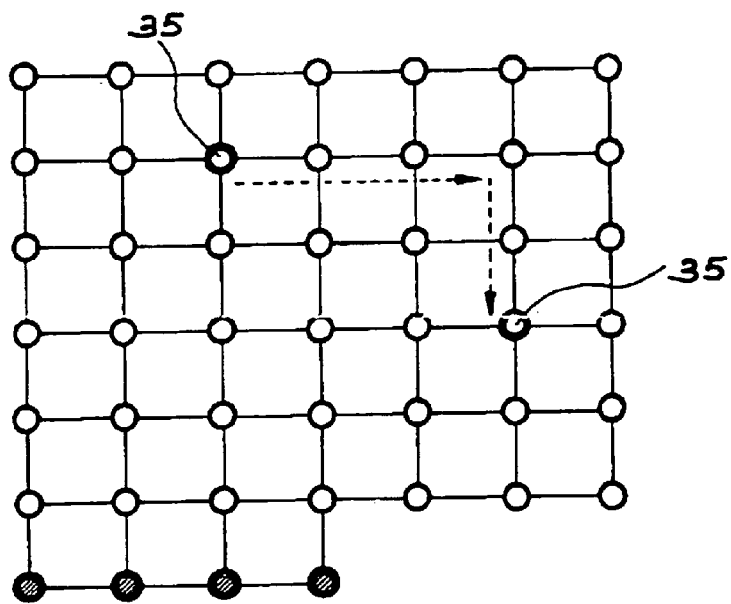
FIG. 3 illustrates the concept of spacing in the network illustrated in FIG. 2B.

FIGS. 2 and 3 schematically illustrate a network of identical elementary functional elements 30, each basic functional element being logically connected to the same number of neighbouring functional elements of the same network, except for the functional elements located at the edges of the network, and spare functional elements 31 each provided for replacing one of elementary functional elements 30 in case of failure.

FIG. 2A illustrates a network functional element with its four logical neighbours. FIG. 2B illustrates a sample network, with spare functional elements 31 being shaded, links 32 being logical links.

FIG. 3 illustrates the concept of spacing between two functional elements: this is the minimum number of connections required for going from one functional element to another. The two functional elements 35 circled in black are at a distance of five from each other, two neighbouring functional elements being at a distance of one.

It is the object of the inventive method to position functional elements in the network, so as to minimize the sum of distances between all neighbouring functional elements. This method has the following characteristics:

Criterion 1: to choose the functional element positions in order to provide a minimum distance between neighbouring functional elements, positioning is performed around the position of the starting functional element using functional elements at a distance of 0, then 1, then 2, then 3, ... from the logical position of this functional element.

Criterion 2: to make sure that positioning is possible for all network functional elements, whatever the number of faulty or invalid functional elements, first of all, a functional element positioning sequence is defined, which is composed of a starting functional element and a series of functional elements including all functional elements. Each new functional element is chosen from the functional elements which are logically neighbours of the preceding functional elements. Next, following this sequence from the starting functional element to the last functional element, S+1 possible positions, S being the number of spare functional elements, and the position sequence of each functional element are defined, with a restriction being that one and only one spare position must be used with respect to the possible positions of previously positioned functional elements.

Criterion 3: to provide global network consistency, at the end of the positioning operation, a mechanism for complying with consistency may be implemented, which consists in detecting logical inversions of each functional element pair of logical neighbours in each dimension and in inverting the positions of two functional elements when such an inversion has been detected.

To meet these various criteria, the inventive method comprises the following steps:

determining a functional element positioning sequence as defined above under criterion 2;

for each of the functional elements, it is positioned tentatively starting with its logical position, then, if required in case of failure (faulty functional element or position occupied by another functional element) in each of the positions located at a distance 1, a distance 2, etc., while following the rule stated in criterion 2: i.e., one and only one spare position must be used with respect to the possible positions of previously positioned functional elements. If the position does not follow this rule, another position is tested, which can be at a greater distance if required. The process stops when S+1 positions have been tested;

if S+1 positions have been tested without success, returning to the preceding functional element in the positioning sequence and proceeding with the next position for this functional element;

when all functional elements have been positioned, checking for each dimension of the system, e.g. in lines and in columns for a functional element array, that the logical sequence is followed for each pair of functional elements. If not, the positions of these functional elements are inverted.

Figure 4:
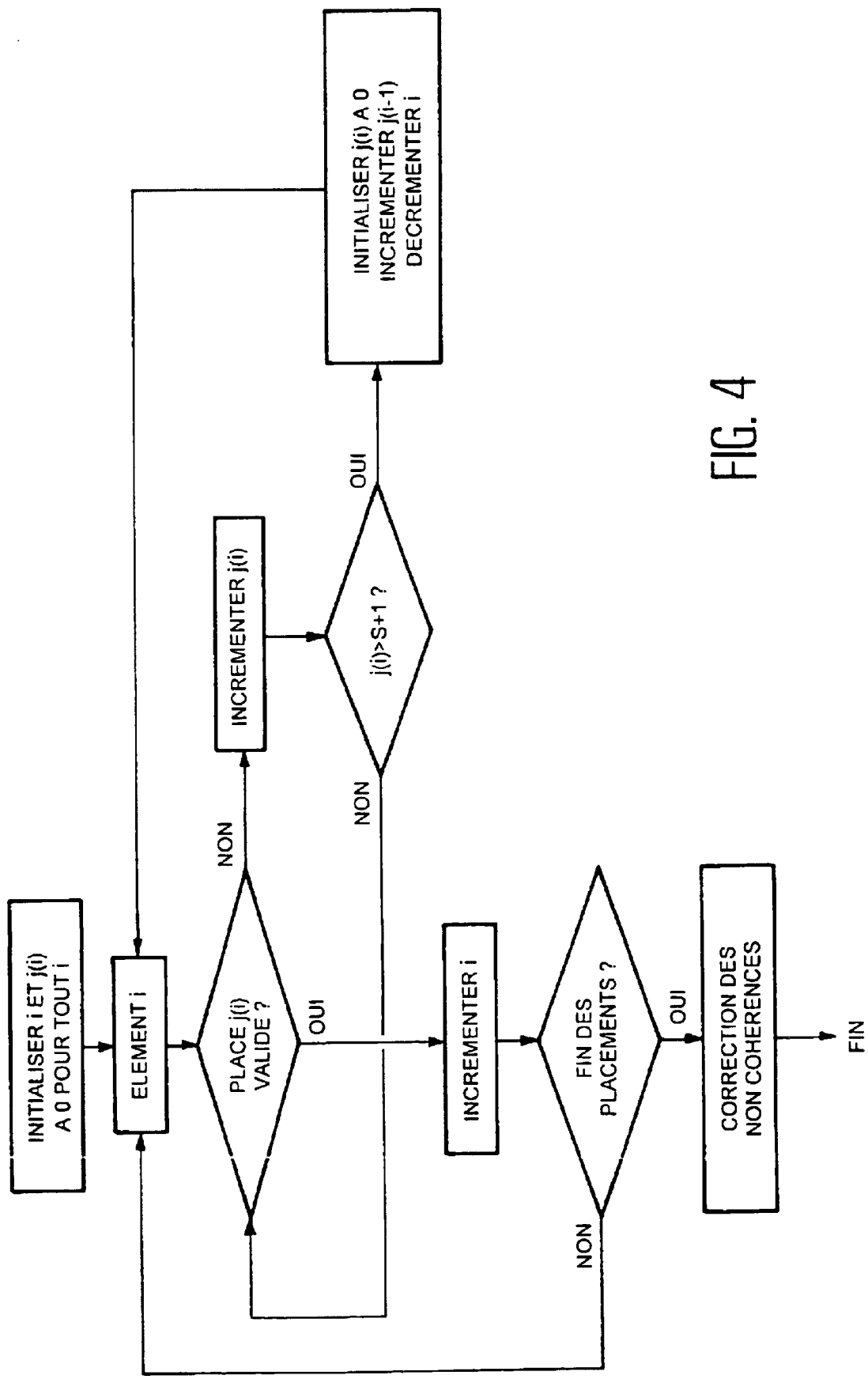
FIG. 4 illustrates a flowchart of the inventive method.

The flowchart illustrated in FIG. 4 sums up the last three steps of this method.

Figure 5A:
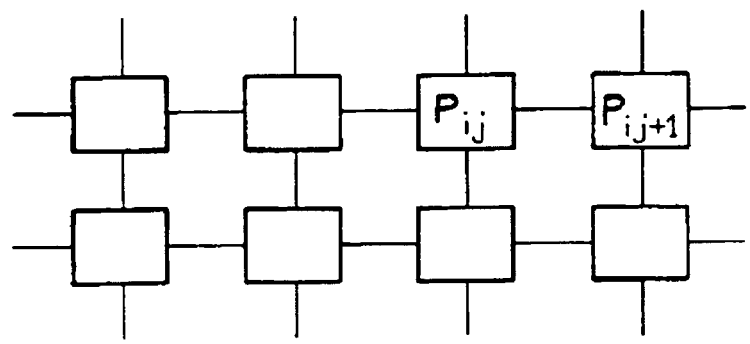
FIGS. 5A and 5B illustrate an example of inconsistency of the inventive method after the functional elements have been positioned.
Figure 5B:
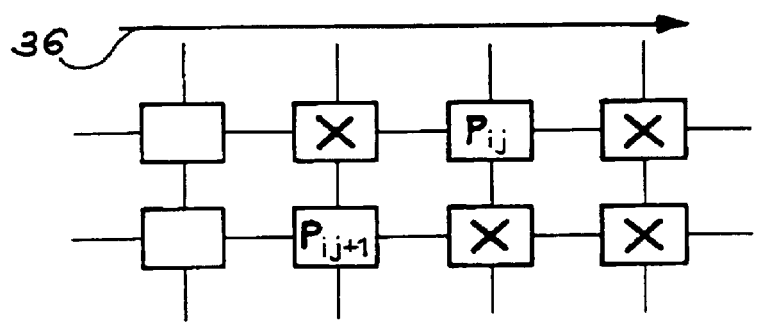

FIGS. 5A and 5B illustrate an example of inconsistency in the network after functional elements have been positioned. Indeed, in FIG. 5A, both functional elements $P_{ij}$ and $P_{ij+1}$ are logical neighbours and $P_{ij}$ is located before $P_{ij+1}$. In FIG. 5B, functional element $P_{ij}$ is positioned after functional element $P_{ij+1}$ in contrast with the logical sequence, with arrow 36 illustrating the positioning sequence, points marked with a cross indicating positions occupied by faulty functional elements.

This positioning algorithm is bound to reach a solution provided the number of faulty functional elements is less than or equal to the number of spare functional elements.

Two types of positioning algorithms can be deduced from the inventive method.

The first type of algorithm consists in directly using the inventive method and is illustrated by FIG. 6 with a structure of 4×4 elementary functional elements and 4 spare functional elements.

Figures 6A, 6B, 6C:
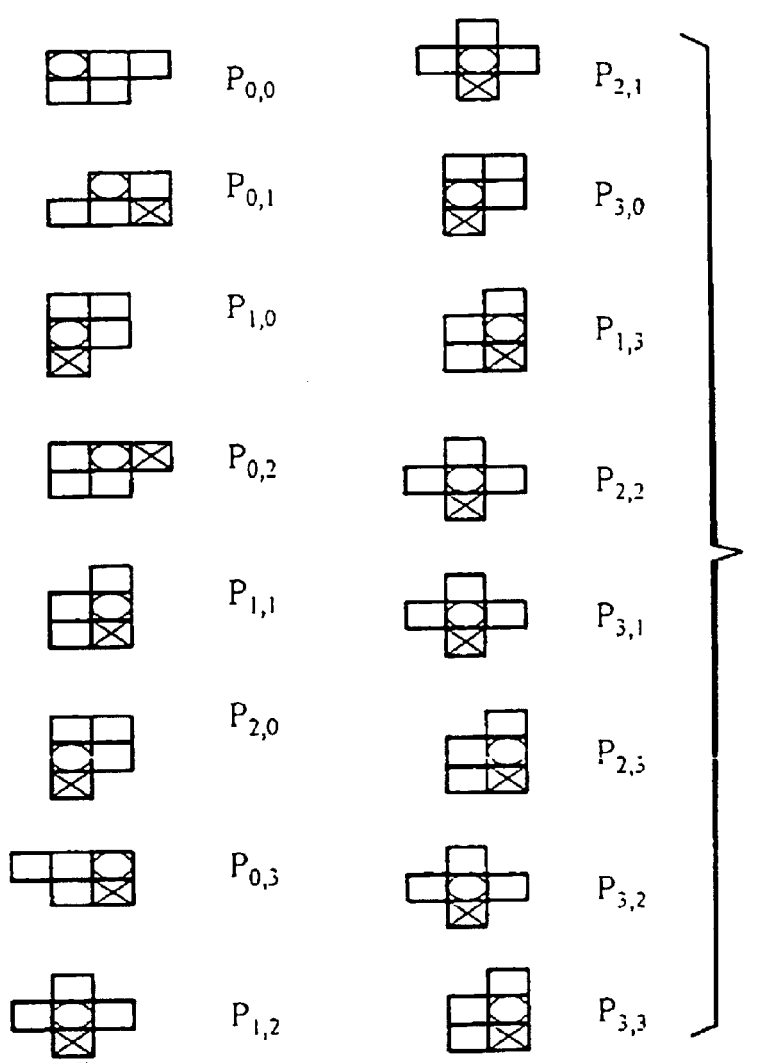
FIGS. 6A, 6B and 6C illustrate a sample positioning algorithm directly derived from the inventive method.

FIG. 6A illustrates the logic network, the logical neighbours of a functional element being at the 4 cardinal points thereof. FIG. 6B illustrates the positioning sequence of the functional elements and FIG. 6C illustrates the possible positions of these functional elements, the positions at a distance of 1 from the logical position of the functional element being tested before the positions at a distance of 2, etc.

In this FIG. 6C, the following symbols are used:

0: logical position of the functional element x: new position of the functional element □: possible position of the functional element The positioning sequence is defined like this: the starting functional element is the top left functional element $P_{0,0}$. The following functional elements are the functional elements to the right $P_{0,1}$ and below $P_{1,0}$ starting functional element $P_{0,0}$, and so on, following the diagonal $P_{1,0}$; $P_{0,2}$; $P_{1,1}$ ... (see FIG. 6B). This solution, which is one of the possible solutions for the choice of the positioning sequence, has the advantage of allowing criterion 1 to be correctly followed in the series, and thus to provide positioning enabling proper routing. Based on this positioning sequence, the positions of each functional element are chosen from the five positions defined in FIG. 6C, their selection sequence complying with criterion 1. It is noted that for each functional element, criterion 2 is complied with.

Figure 7:
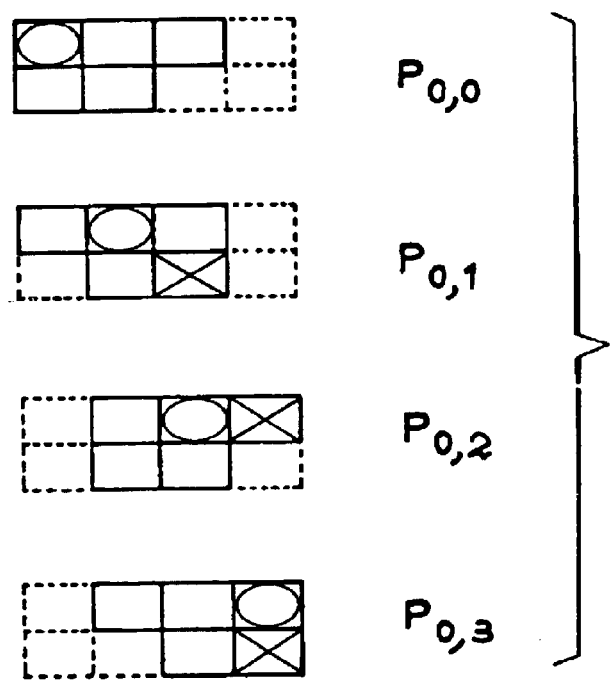
FIG. 7 illustrates a block algorithm derived from the inventive method.

The second type of positioning algorithm is an application of the inventive method by dividing the network into functional element blocks. After having defined a block positioning sequence, starting with a starting block, all blocks are passed, from one neighbouring block to the next. If such an algorithm is applied to each block by taking into account a positioning rule so that the possible positions for the functional elements of one block do not include any logical position of the functional elements of previously positioned blocks, positioning is ensured. FIG. 7 illustrates this second type of algorithm considering a block composed of one line of four functional elements. The lines of functional elements are then positioned starting with the top line and going to the bottom line. For each line, positions are used of this line, to which the logical functional elements belong, and of the immediately lower line, which allows the above rule to be followed. For each line, the positioning sequence is defined by the starting functional element located at the leftmost end and then by the functional elements following to the right. The five possible positions are then defined as shown in FIG. 7. The same positioning algorithm is used for each line. Consistency checking, which is not required in the example considered, must then be done for lines only. The advantage of this alternative of the inventive method is algorithm speed (less going back, shorter consistency checking) together with correct positioning when blocks are actually dimensioned with respect to spare elements, which is the case in the example considered.

Figure 8A:
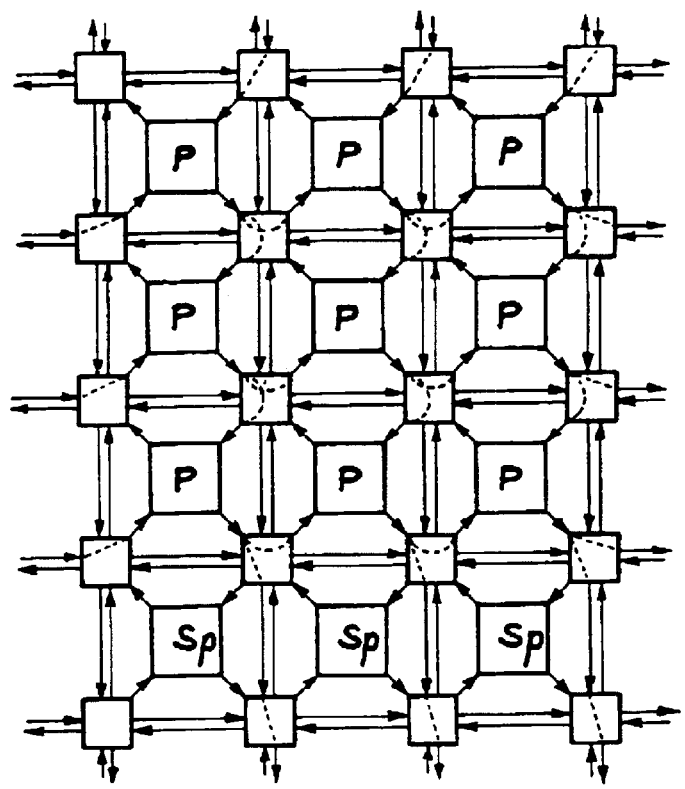
FIGS. 8A and 8B illustrate examples of reconfiguring a network of functional elements in a matrix topology.
Figure 8B:
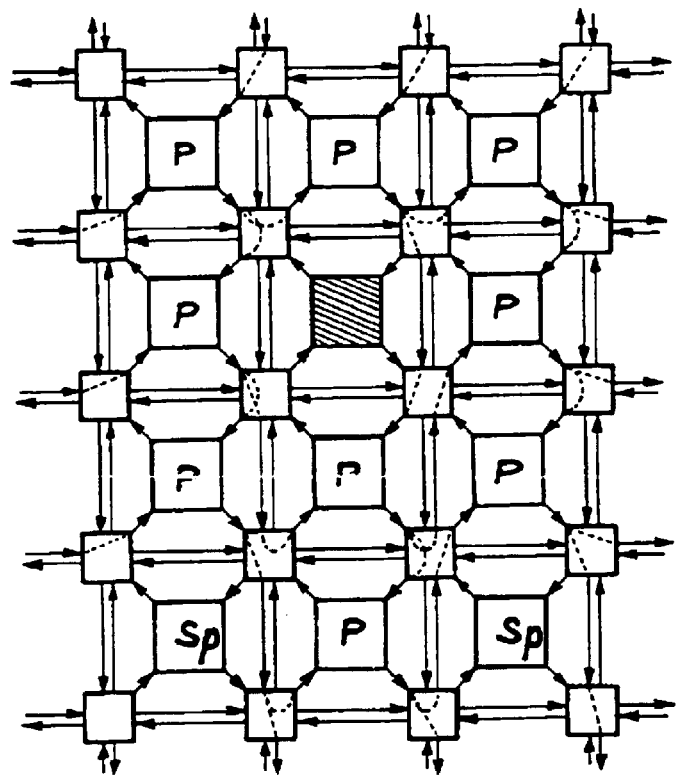

FIG. 8A illustrates a sample configuration of the network in a matrix topology, without any faulty functional elements, for West/East and North/South connections. FIG. 8B illustrates a sample reconfiguration of the network in the case of a faulty functional element, represented as shaded.

It is noted that it is mandatory to pass through the switching elements even if there are no faulty functional elements, giving the whole system a certain consistency.

Routing Step

This step is performed by means of shortest track and in-depth search algorithms known by those skilled in the art.

In order to be in line with the objects determined in the introduction, the number of interconnecting elements between logical neighbouring functional elements is limited to a small number, typically 3 or 4. The number of possible tracks for going from one functional element to a neighbouring functional element is known and rather low, less than about ten as an average. It is assumed that all these tracks are known, but they can also be calculated by a shortest track search algorithm. A simple example of the in-depth search routing algorithm of the interconnecting elements is given below:

```
Set i and j to 0
Point 0: For the pair C_j of neighbouring functional
elements:
    Point1:  If track C_j(i) exists:
                test routing C_j with this track
                If there is a conflict with an
                interconnecting element
                    increment i and return to Point 1
                Else,
```

```
                    If there are other pairs C of
                    functional elements:
                        increment j and return to Point
                        0
                    Else,
                        routing successful, end
        Else,
            If there. is a pair C_k of functional elements
            routing of which makes routing of C_j impossible
                Delete all routings between C_k and
                C_j
                Increment track i of C_k and return
                to point 0
            Else
                Routing impossible
End
```

This is just a sample routing known to those skilled in the art which allows to give an illustrative embodiment of the inventive reconfiguration method.

Below, we are going to consider successively illustrative embodiments of networks to which the method of the invention is applied, where the functional elements are processors.

Example of a Parallel Processor Network

Figure 9:
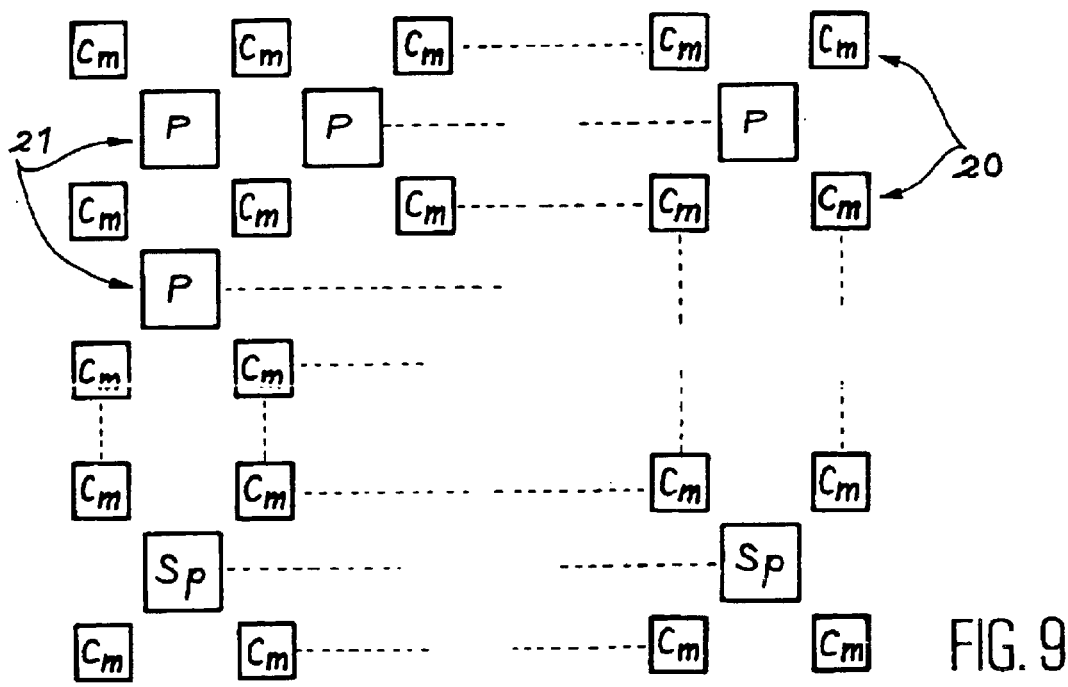
FIG. 9 illustrates the composition of a processor network obtained by the inventive method.

A processor network, to which the invention is applied, as illustrated in FIG. 9 is based on a matrix of ordinary elementary processors P with two inputs and two outputs, connected together through interconnecting elements Cm. The network is composed of a set of alternately arranged interconnecting element lines 20 and processor lines 21. Each processor P is surrounded by four interconnecting elements Cm. The edge elements of the network are interconnecting elements Cm. The processor lines are lines of elementary processors P and the last line of processors is a line of spare elementary processors Sp. This feature allows greater flexibility to be obtained in the choice of the number of spare processors in contrast with the prior art device illustrated in FIG. 1, wherein with one line and one column of spare processors, the proportion of spare processors varies depending on the product of the number of lines multiplied by the number of columns.

Figure 10:
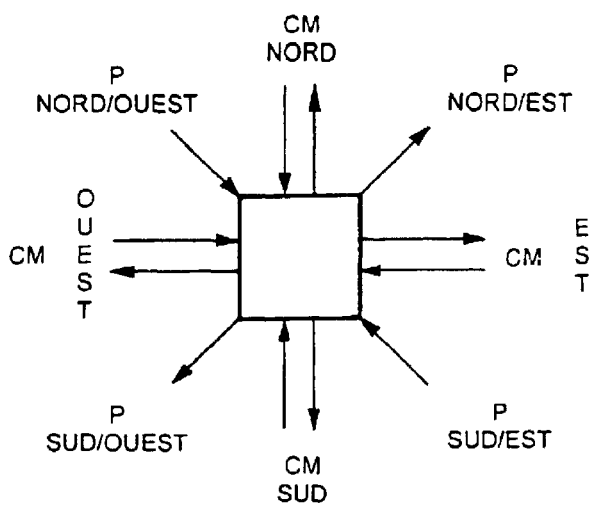
FIG. 10 illustrates inputs and outputs of an interconnecting element inside the network of FIG. 9.

The interconnecting elements Cm allow links to be made between the various processors P, through network switching. One such element Cm is illustrated in FIG. 10, together with its different inputs and outputs. It has six unidirectional inputs and six unidirectional outputs connected respectively to the inputs of the South/West and North/East processors, to the outputs of the North/West and South/East processors, and to the four inputs and four outputs of the interconnecting elements located North, East, South, and West. One element so represented is an element in the middle of the network.

As illustrated in FIGS. 11A to 11H, these interconnecting elements of the network edges have fewer inputs and/or fewer outputs according to their location.

Figure 11:
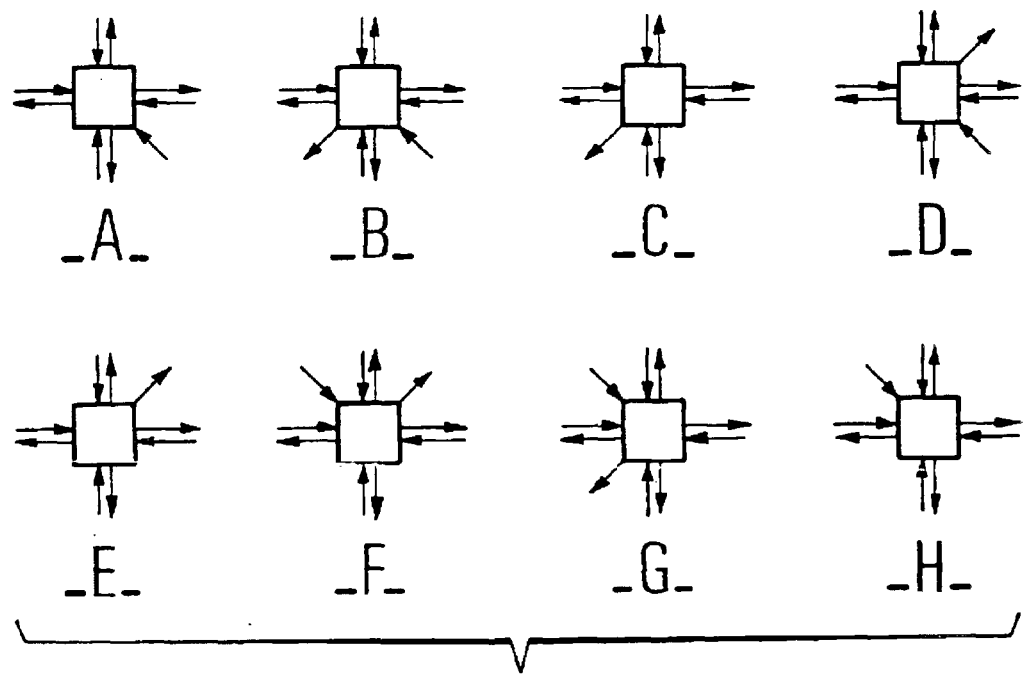
FIGS. 11A to 11H illustrate inputs and outputs of interconnecting elements at the borders of the network of FIG. 9.

Thus:

| | |
|---|---|
| Cm North/West: | FIG. 11A; |
| Cm North: | FIG. 11B; |
| Cm North/East: | FIG. 11C; |
| Cm West: | FIG. 11D; |
| Cm South/West: | FIG. 11E; |
| Cm South: | FIG. 11F; |

-continued

| Cm East: | FIG. 11G; |
| Cm South/East: | FIG. 11H; | is obtained.

Each output of an interconnecting element Cm can be connected to any input. It is possible to dynamically change the way (called configuration) of making these links, e.g. by means of configuration registers associated with a configuration command.

Figure 12:
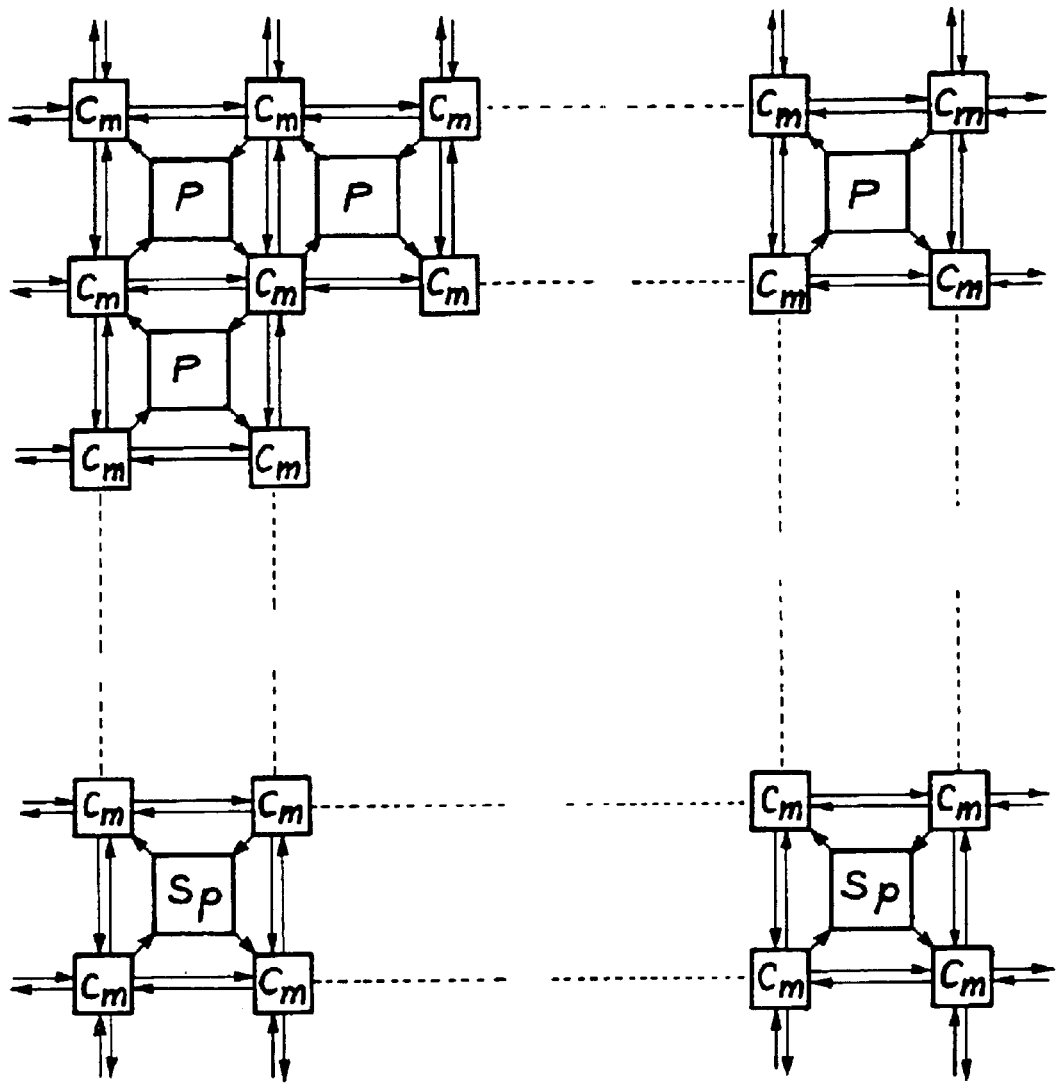
FIG. 12 illustrates the network of FIG. 9, with the links between processors and interconnecting elements.

As illustrated in FIG. 12, in this network, each processor P is connected to four interconnecting elements Cm, two of these diametrically opposed elements Cm being connected to the two processor inputs, and the other two elements Cm, also diametrically opposed, being connected to the two processor outputs. These interconnecting elements Cm are moreover connected together through horizontal or vertical links.

Each communication between processors P is done via interconnecting elements Cm. Thus, 50% of additional internal connections are obtained in comparison with "operational" connections, and additional connections with the outside are reduced to the connections of spare processors Sp.

Figure 13A:
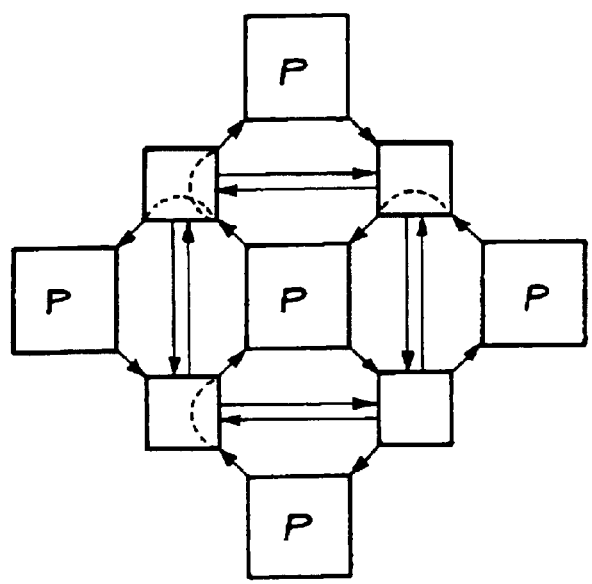
FIGS. 13A to 13C illustrate minimum communications in the network of FIG. 9.
Figure 13B:
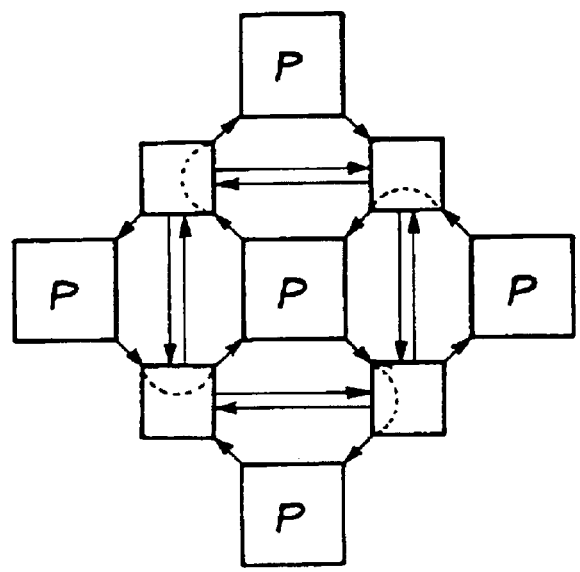
Figure 13C:
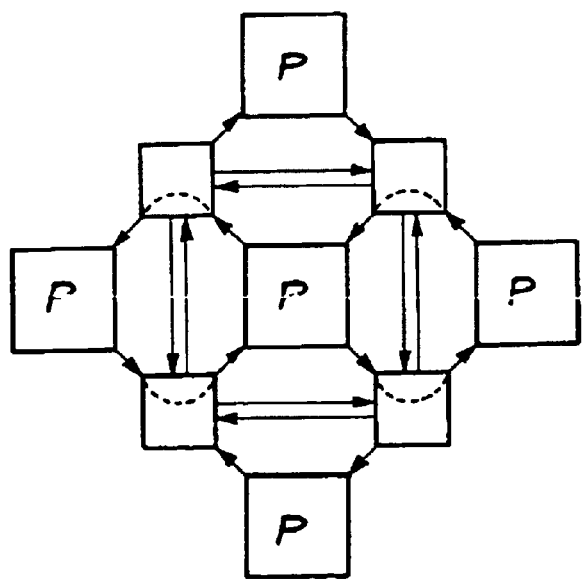

The communications supported by the network are at a minimum those described in FIG. 13: South/North and South/West communications being illustrated in FIG. 13A; mixed communications being illustrated in FIG. 13B; East/West communications being illustrated in FIG. 13C; each communication illustrated in these figures having a "dual" communication.

Other communications can of course be envisaged.

In the fault tolerance method of this network, the spare processors Sp of the last line are used to replace the defective elementary processors P of the other lines.

Sample Embodiment of Such Processor Network

In this embodiment, the processor network is composed of a matrix of nine processors and sixteen interconnecting elements. Each processor P is a simple computing element integrating an arithmetic and logic unit, a set of work registers, and a test logic allowing the automatic test of the processor (the so-called "integrated" test) to be performed. When a test program is run, this logic transmits an integrity testing signal t_i indicating whether the processor is faulty. Processor P is not described herein as it is well known to those skilled in the art.

Figure 14:
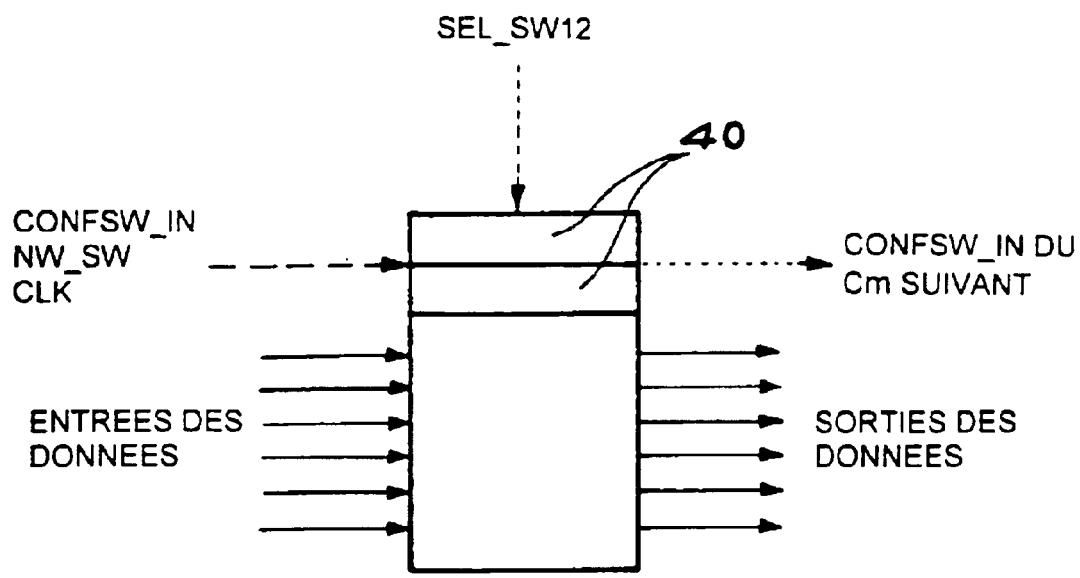
FIGS. 14A and 14B illustrate the practical implementation of an interconnecting element inside the network of FIG. 9 based on a 6-to-1 multiplexer.
Figure 14:
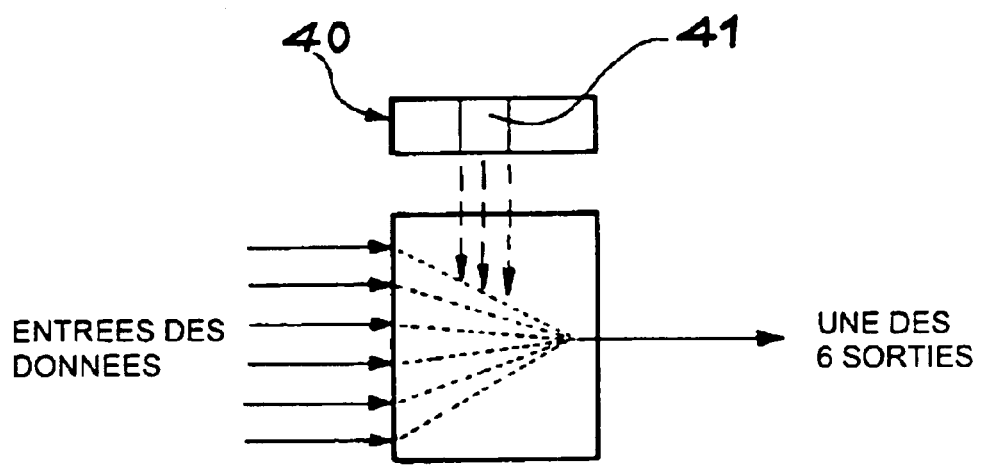

An interconnecting element is of the type as illustrated in FIG. 10, the interconnecting elements of FIGS. 11A to 11H only being simplified derivatives thereof. This interconnecting element, as illustrated in FIG. 14A, is composed of six data multiplexers having six inputs to one output. Each of these multiplexers is controlled by three wires for selecting the output channel in order to allow each of the outputs of the interconnecting element to be connected to any input. The data field width of each of the channels is 4 bits in this case. The selections of the six multiplexers are stored in two 40 and 18-bit registers each (3 selection bits for each multiplexer) inside the interconnecting element. These registers 40 have a double functionality as they can operate as standard registers and shift registers when loaded. These two configuration registers 40 allow two different configurations of the network to exist together dynamically.

FIG. 14B illustrates the details of the multiplexer control, with area 41 being the control area of this multiplexer in one of registers 40.

Loading both reconfiguration registers 40 is done serially by means of the signals nw_sw and confsw_in. The signal nw_sw ("not-write switch") allows the configuration signal confsw_in ("configuration switch input") to be written in the first flip-flop of a register 40 when it is low and prohibits this write operation when it is high. Configuration loading is synchronous and thus dependent on the global system clock clk. When the write operation of confsw_in is authorized in the first flip-flop of one of registers 40, the contents of this flip-flop are loaded into the second flip-flop and so on, up to the last flip-flop, the contents of which are the signal confsw_in of the next interconnecting element. During the load operation, the signal sel_sw12 ("selection switch configuration ½") allows the register wherein configurations are to be loaded to be selected and also the configuration of the interconnecting elements to be selected dynamically, i.e. configuration of the interconnecting elements to be varied during a program run, at each clock period. An interconnecting element is thus composed of 24 data bits at the input, 24 data bits at the output, two configuration loading signals and one dynamic configuration change signal (during normal operation) between the configurations loaded into the internal registers of the interconnecting elements.

Figure 15:
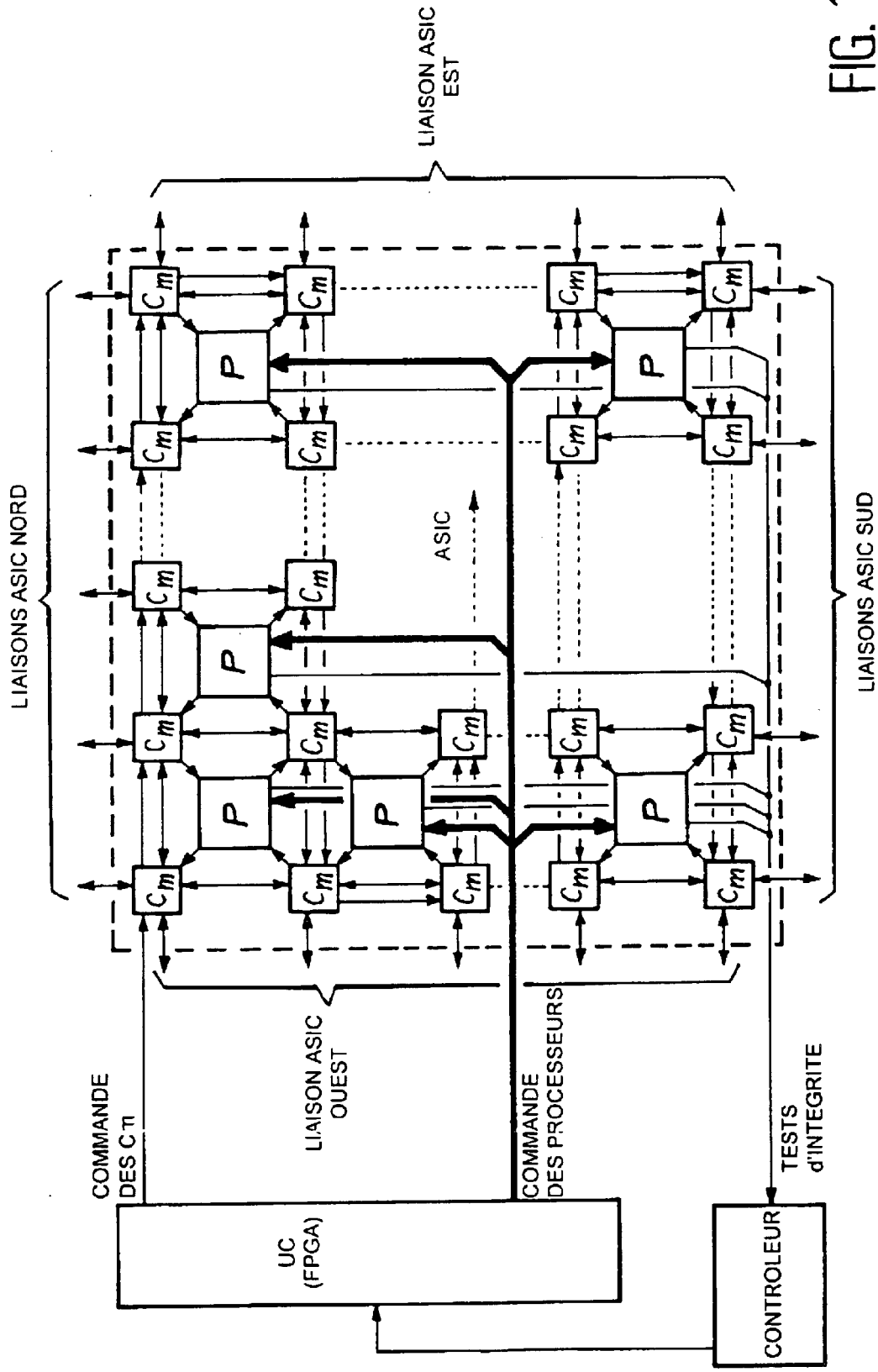
FIG. 15 illustrates a sample implementation of the network of FIG. 9.

Processors P and interconnecting elements Cm are connected as illustrated in FIG. 15. The unit composes the matrix of processors which is controlled by a control unit CPU. This control unit CPU sends instructions to the processors enabling operations to be performed and controls the interconnecting elements by means of the three signals confsw_in, nw_sw, and sel_sw12 mentioned previously. The control unit thus allows to run standard programs as well as processor test programs. The control unit periodically performs the processor test which feed back their status to a controller via the signal t_i. The diagnostic of the processor matrix is then performed by the controller by interpreting the signals t_i of all processors. The controller can perform the calculation of the new configurations of the interconnecting elements corresponding to the status of the processor matrix. It then informs the control unit of these new configurations. The control unit then sends the information allowing to configure different interconnecting elements, then sends the orders for running calculation programs on the active processors.

The processor matrix as well as the interconnecting elements can be integrated into an application specific integrated circuit (ASIC). The control unit can be integrated in reconfigurable logic components (FPGA="Field Programmable Gate Array"), for greater flexibility of use. The controller can be implemented by means of a computer, an FPGA component or even a dedicated module.

In the preceding description, separate dynamic control by the control unit of each of the interconnecting elements has been envisaged; without leaving the scope of the invention, it would be possible to perform said control statically, without using the control unit, e.g. through a processor outside the system.

Example of a Hypercube Network

Many architectures with the regularity rule, or which can be reduced to a regular structure as defined previously, can benefit from the positioning method of the invention.

An example of a regular network is the hypercube with n dimensions. In this processor network, each processor is connected directly to n other processors following a rule on binary processor numbering (each processor is connected to the processors with the adjacent binary word, i.e. the binary number of which differs by one bit only). An example of a hypercube of dimension 3 and thus having 16 processors is given in FIG. 16.

This structure, which is regular when represented in space, looses regularity on paper due to a perspective effect. However, it also looses regularity when it is implemented on an electronic board which only accepts surface components. In order to take this issue into account, the network illustrated in FIG. 17 shows the real links, the virtual links which allow the structure to be regular in two dimensions, and the spare processors Sp with (virtual) links connecting them to the main structure.

Thus, we are returned to a regular 2-D structure comprising four spare processors. The spacing concept which defines the measure for positioning processors "fittingly" is a distance calculated with respect to this structure. Under such conditions, the positioning algorithms are the same as those used for 2-D meshing, the physical embodiment of the network prevailing over its logical function.

Figure 18:
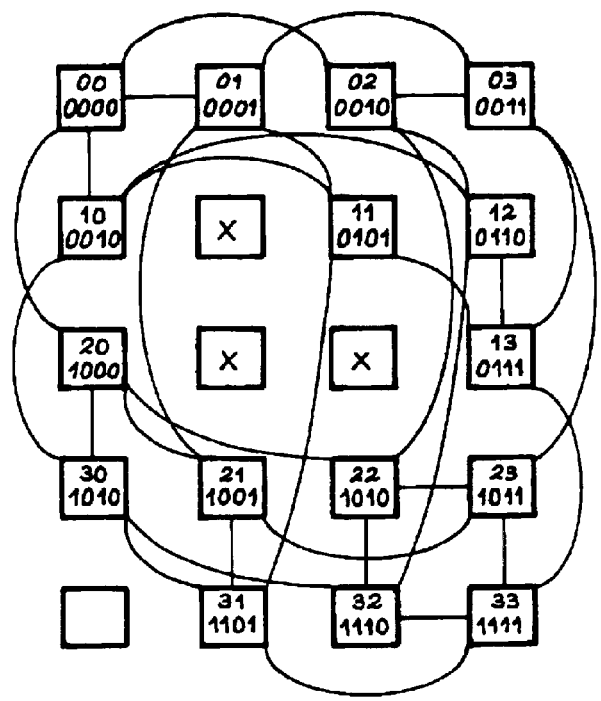

FIG. 18 thus shows a sample reconfiguration obtained with three faulty processors. Solid line links are physical links to be made so as to maintain the hypercube structure.

Figure 19:
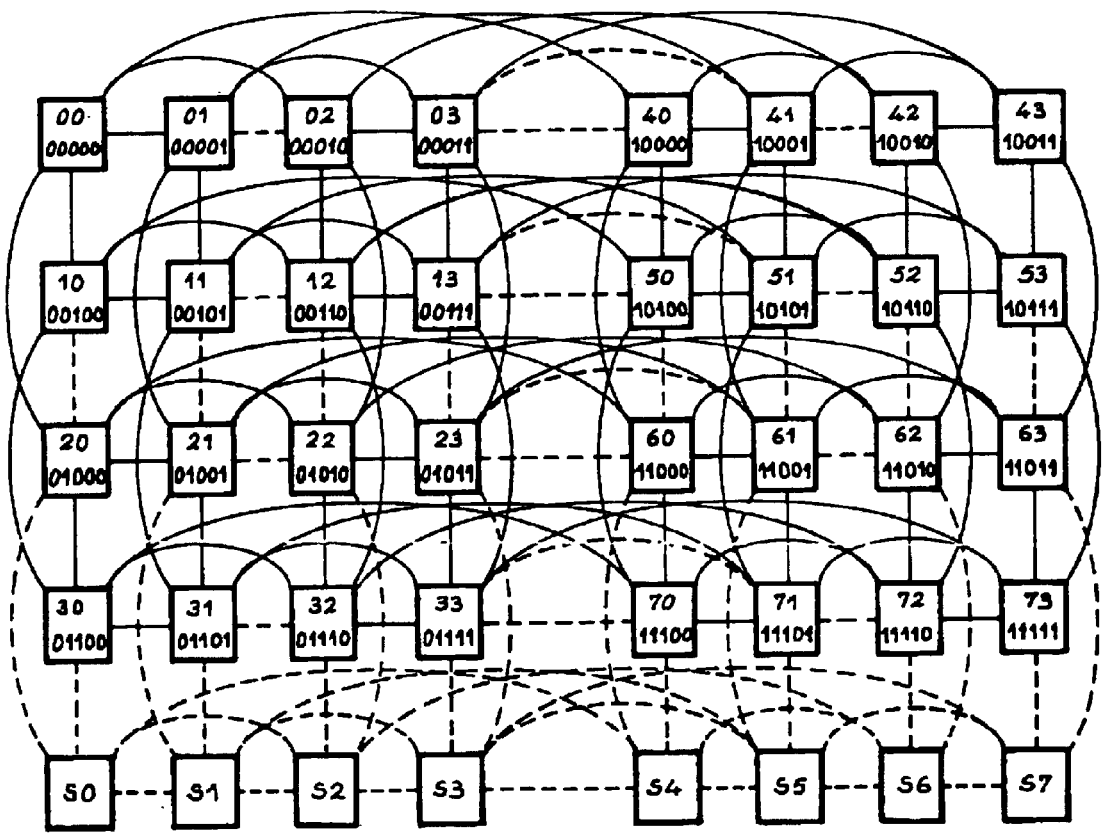

Finally, FIG. 19 shows an extension of the virtual link principle for a hypercube network of dimension 4 comprising a line of spare processors. The positioning algorithm used is then the same as the one used for the 2-D mesh structure comprising 8 lines×4 columns and one line of spare processors.

The reconfiguration method does not restrict the choice of the fault tolerant structure whereon such a structure can be implemented, which can therefore be completely arbitrary.

The method of the invention can also be used in view of obtaining a fault tolerant structure in digital electronic system architectures using many identical functional elements with line, matrix or hypercube interconnection. The only constraint is to make sure that each functional element can be tested, either locally or globally, so that the positioning/routing algorithm can be aware of faulty functional elements.

It is difficult to identify all electronic architectures which can benefit from the invention. However, a few examples can be introduced.

1D or 2D Correlator

Figure 20:
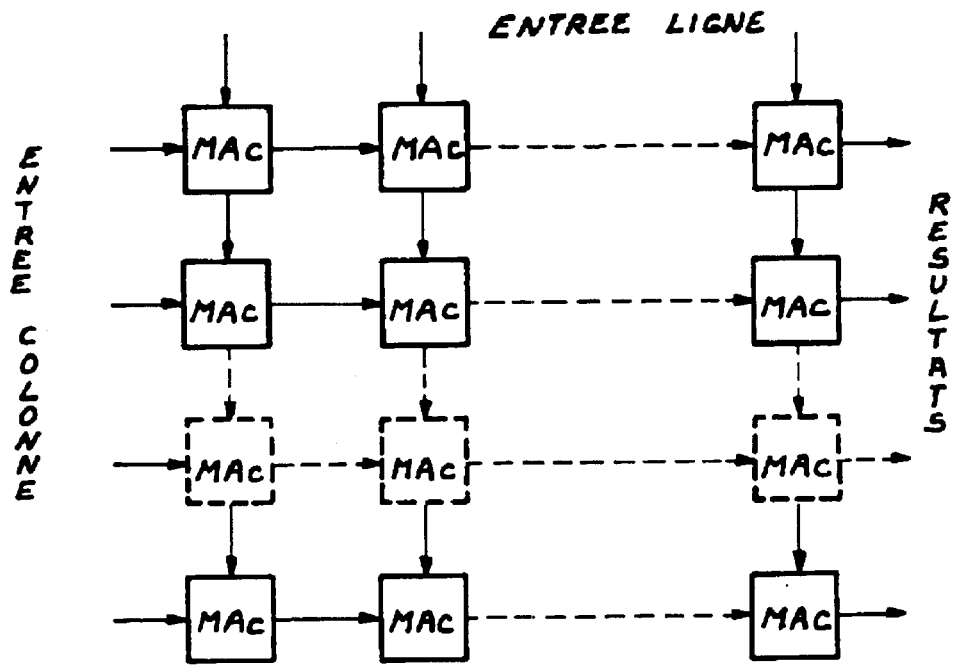
FIG. 20 illustrates the architecture of a 2D correlator.
Figure 21:
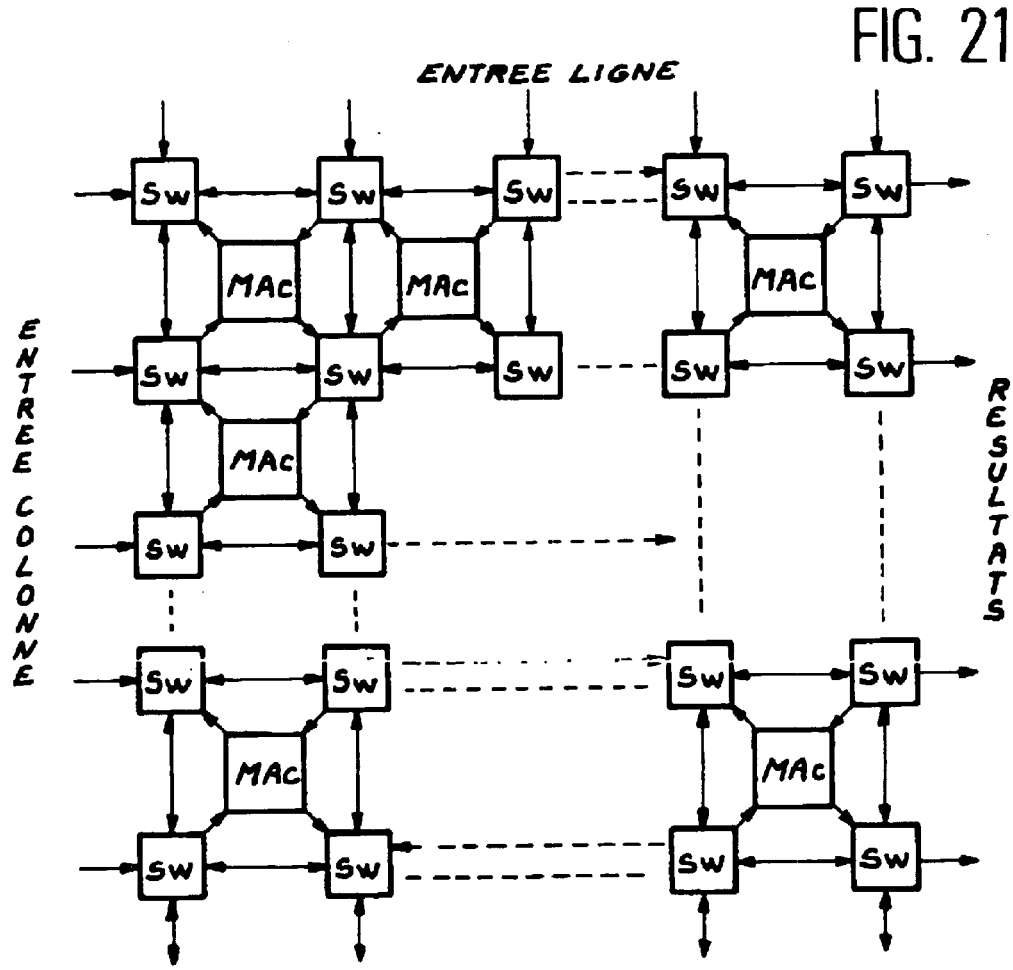
FIG. 21 illustrates an example of using the inventive method in a matrix structure of the architecture illustrated in FIG. 20.

This is the in line or matrix association of functional elements the function of which is to perform a multiplication of the inputs followed by an addition of the result of this multiplication to the preceding result. This is then called a Multiplier Accumulator (MAc), as illustrated in FIG. 20. The "line input" data is correlated with the "column input" by means of Multiplier Accumulator (MAc) cells arranged in an array, all cells being identical. Then, the inventive method is easily implemented, as illustrated in FIG. 21. The last line of the matrix is the "spare MAc" line.

Matrix Architecture of Blocks Calculating the Fast Fourier Transform (FFT)

This architecture is also arranged based on a matrix assembly of MAc type functional elements with a more complex interconnection scheme, in multiple stages (FFT butterfly), but still having two inputs and two outputs per MAc. Adding a spare line of functional elements as well as switching elements allows to tolerate failures in the whole logical structure.

The latter two examples show that the inventive method can be used for digital electronic architectures interconnecting a set of identical functional elements, other than processors. The very regular structures of FPGA ("Field Programmable Gate Array") components also matrix interconnecting reconfigurable logic blocks (e.g., based on RAM) can also benefit from the method of the invention.

Finally, the field of telecommunications must also benefit from the inventive method. Indeed, e.g. in message routers, identical functional elements are interconnected to form the whole system.

REFERENCES

[1] "Architectures electroniques" (CEA Technologies no. 29 "Le traitement du signal et de l' image", pages 3–5)

[2] "Handwave-Efficient and Highly-Reconfigurable 4- and 2-Track fault Tolerant Designs For Mesh-Connected Multicomputers" by Nihar R. Mahapatra and Shantanu Dutt (IEEE, 1996, pages 272 to 281)

What is claimed is:

1. A method for reconfiguring a network of parallel identical functional elements tolerant to the faults of these functional elements, the network comprising said basic functional elements (P), spare functional elements (Sp), interconnecting elements (Cm) of these functional elements, and a control unit, said method being characterized in that it comprises:

a step of positioning the functional elements of the logic network;

a routing step of programming interconnecting elements on the physical network, by choosing a maximum number of interconnecting elements which can be passed between two neighboring processors using a shortest track search algorithm.

2. The method according to claim 1, wherein:

network functional element positioning sequence which is composed of a starting functional element and a sequence of functional elements including all functional elements is determined;

for each of the functional elements, it is positioned tentatively starting with its logical position, then, if required in case of failure, in each of the positions located at a distance 1, distance 2, . . . from the logical position of this functional element, a restriction being that one and only one spare position is to be used with respect to the possible positions of previously positioned functional elements, stopping when S+1 positions have been tested, S being the number functional elements;

if S+1 positions have been tested without success, returning to the previous functional element in the positioning sequence and proceeding with the next position for this functional element.

3. The method according to claim 2, wherein, when all functional elements have been positioned, it is checked for each network dimension that the logical sequence is followed for each functional element pair, if not, the positions of these functional elements are inverted.

4. The method according to claim 1, wherein said positioning step comprises starting with the top left functional element, continuing with the following functional elements to the right and below the previous functional element following a diagonal path.

5. The method according to claim 1, wherein the network is divided into functional element blocks, wherein said positioning step comprises starting with a starting block and going through all the blocks from one neighboring block to the next, the possible positions for the functional elements of one block not including any logical position of the functional elements of previously positioned blocks.

6. The method according to claim 1, wherein the functional elements are processors.

* * * * *